US008888000B2

(12) United States Patent
Lu et al.

(10) Patent No.: US 8,888,000 B2
(45) Date of Patent: Nov. 18, 2014

(54) CARD READER WITH MULTIPLE FUNCTIONS AND A METHOD FOR IMPLEMENTING THE SAME

(75) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 539 days.

(21) Appl. No.: 12/933,491

(22) PCT Filed: Dec. 10, 2009

(86) PCT No.: PCT/CN2009/075458
§ 371 (c)(1),
(2), (4) Date: Sep. 20, 2010

(87) PCT Pub. No.: WO2010/075730
PCT Pub. Date: Jul. 8, 2010

(65) Prior Publication Data
US 2011/0042457 A1    Feb. 24, 2011

(30) Foreign Application Priority Data

Dec. 31, 2008   (CN) .......................... 2008 1 0247460

(51) Int. Cl.
*G06K 5/00*        (2006.01)
(Continued)

(52) U.S. Cl.
CPC  *G06K 7/00* (2013.01); *G06F 21/34* (2013.01);
(Continued)

(58) Field of Classification Search
CPC .................. G06K 19/07733; G06K 19/07732;
G06K 19/07; G06K 7/0008; G06K 19/07741;
G06K 7/0013; G06K 7/0021; G06K 7/10297;
G06K 19/07769; G06K 19/07739; G06K 7/00;
G06K 19/0719; G06K 19/0728; G06K
19/07703; G06K 19/07743; G06K 19/07749;
G06K 7/0043; G06K 7/10465; G06F 13/385;
G06F 3/0679; G06F 13/102; G06F 13/387;
G06F 2213/0042; G06F 3/0227; G06F
13/4027; G06F 11/1417; G06F 11/0757;
G06F 11/1441; G06F 12/1408; G06F
2221/2141
USPC .................. 235/380, 492, 382, 486, 488, 383;
713/172, 160; 705/44, 64
See application file for complete search history.

(56) References Cited

U.S. PATENT DOCUMENTS

2001/0054148 A1 * 12/2001 Hoornaert et al. ............. 713/172
2002/0011516 A1 *  1/2002 Lee ............................... 235/380
(Continued)

FOREIGN PATENT DOCUMENTS

CN          1614620 A        5/2005
WO    WO 2005062157 A1 *   7/2005

*Primary Examiner* — Thien T Mai
(74) *Attorney, Agent, or Firm* — Hammer & Associates, P.C.

(57) ABSTRACT

The invention discloses a method for implementing a card reader with multiple functions and a card reader therewith. The method includes that a card reader determines whether a card is inserted in the slot of the card reader and whether the card reader is online; if no card is inserted in the slot, the card reader performs operation to generate a one-time password; if a card is inserted in the slot and the card reader is online, the card reader performs corresponding operation on the card according to the card operating requirement, while if a card is inserted in the slot and the card reader is offline, the card reader performs operation with the card to generate a Token; otherwise, to end the process. The card reader includes a power module, an input/output module, a determining module, an operating module, and a performing module. With good common performance, the card reader provided by the invention performs as smart card reader and verification whether a card is inserted in the card reader or not, which overcomes the shortcomings that the card reader in the prior art has simplex function.

16 Claims, 4 Drawing Sheets

(51) Int. Cl.
  *G06K 19/06* (2006.01)
  *G06K 7/00* (2006.01)
  *G06F 21/34* (2013.01)
  *G06F 21/83* (2013.01)
  *G07F 7/08* (2006.01)
  *G07F 7/12* (2006.01)
(52) U.S. Cl.
  CPC .............. *G06F 21/83* (2013.01); *G06K 7/0008* (2013.01); *G07F 7/0873* (2013.01); *G07F 7/122* (2013.01)

USPC .......................................... 235/380; 235/492

(56) References Cited

U.S. PATENT DOCUMENTS

| 2004/0107170 | A1* | 6/2004 | Labrou et al. .................... 705/64 |
| 2004/0211835 | A1* | 10/2004 | Tournemille et al. .......... 235/441 |
| 2005/0061875 | A1* | 3/2005 | Zai et al. ....................... 235/383 |
| 2010/0250435 | A1* | 9/2010 | Pedersen et al. ................ 705/44 |

\* cited by examiner

CARD READER WITH MULTIPLE FUNCTIONS AND A METHOD FOR IMPLEMENTING THE SAME

FIELD OF THE INVENTION

The invention relates to information security field, and more particularly, to a card reader with multiple functions and a method for implementing the same.

BACKGROUND OF THE INVENTION

With the high speed development of digital information technology, the digital information technology broken through the traditional limitation involves the electronic product of commerce, trade, and consuming fields. At present, with the smart card is used more and more widely, the smart card is applied in all aspects of human life.

In usage, the smart card needs an interface device, which is a card reader for supporting the operation of a card. For providing an economic, safe, and general interface for a card and a computer, the card reader is adaptable to all kinds of computer interfaces. With powerful inbuilt software, the card reader is compatible to the existed or will-be-produced smart cards, operating systems, or industry API (Application Programming Interface) standards. Now the card reader can be used in fields such as enterprise security, PKI infrastructure, online banking, e-business, and the like. With the powerful, secure, and portable smart card, consolidate and integrated security policy can be implemented in an organization via the card reader.

When a card reader according to the prior art is applied to a smart card, the card reader must be linked to a computer first and then the smart card must be inserted in the card reader. The user can communicate with the smart card by the card reader. All of the application is based on the smart card and the card reader is a transparent channel only. So the function of the card reader is simplified and has narrow application field.

SUMMARY OF THE INVENTION

A method for implementing a card reader with multiple functions, wherein the method includes determining, by the card reader, whether a card is inserted in the slot of the card reader and whether the card reader is online;

performing, by the card reader, operation to generate a one-time password, if no card is inserted in the slot of the card reader;

performing corresponding operation on a card according to a card operating requirement sent from a computer, if the card is inserted in the slot of the card reader and the card reader is online; or performing operation with a card to generate a Token, if the card is inserted in the slot of the card reader and the card reader is offline.

Preferably, the method includes determining, by the card reader, whether a card is inserted in the slot of the card;

performing operation, by the card reader, to generate a one-time password, if no card is inserted in the card reader; otherwise determining, by the card reader, whether the card reader itself is online, performing, by the card reader, corresponding operation on the card according to the card operating requirement sent from the computer, if the card reader is online;

performing, by the card reader, operation with the card to generate a Token, if the card reader is offline.

Preferably, the method includes determining, by the card reader, whether the card reader is online;

determining, by the card reader, whether a card is inserted in the slot of the card reader, if the card reader is online;

performing, by the card reader, operation to generate a one-time password, if no card is inserted in the slot;

performing, by the card reader, corresponding operation on the card according to the card operating requirement sent from the computer, if the card is inserted in the slot;

determining, by the card reader, whether a card is inserted in the slot of the card reader, if the card reader is offline;

performing, by the card reader, operation to generate a one-time password, if no card is inserted in the slot; and performing, by the card reader, operation with the card to generate a Token, if the card is inserted in the slot.

Preferably, before performing, by the card reader, operation to generate a one-time password, the method further includes determining, by the card reader, whether the user requires to obtain one-time password; if so, performing the step of performing operation to generate a one-time password, otherwise, ending the process and returning to the status of waiting for system call.

Preferably, determining, by the card reader, whether the card reader is online is performed by checking the USB status of the card reader.

Preferably, before performing, by the card reader, corresponding operation on the card according to the card operating requirement sent from a computer, the method further includes determining, by the card reader, whether an operating requirement is sent from the computer, if so, performing the step of performing corresponding operation on the card according to the requirement sent from the computer; otherwise, ending the process and returning to the status of waiting for system call.

Preferably, before performing, by the card reader, operation with the card to generate a Token, the method further includes determining, by the card reader, whether the user requires verification, if so, performing, by the card reader, operating with the cad to generate a Token; otherwise, ending the process and returning to the status of waiting for system call.

A card reader with multiple functions, wherein the card reader includes a power module adapted to supply power to the card reader;

an input/output module adapted to receive information entered by the user, and further to output a one-time password or a Token generated by the card reader;

a determining module adapted to determine whether a card is inserted in the slot of the card reader and whether the card reader is online;

an operating module adapted to perform operation to generate a one-time password if the determining module determines that no card is inserted in the card reader; and perform operation with the card to generate a Token if the determining module determines that a card is inserted in the slot of the card reader and the card reader is offline; and a performing module adapted to perform corresponding operation on the card according to the card operating requirement sent from a computer if the determining module determines that a card is inserted in the slot of the card reader and the card reader is online.

Preferably, the power module is adapted to supply power to the card reader by cells or USB interface.

Preferably, the input/output module includes a keyboard unit, a touching unit, a displaying unit, and a sound generating unit.

Preferably, the determining module includes a card inserting determining unit adapted to determine whether a card is inserted in the slot of the card reader, and to inform the operating module to perform operating to generate a one-time password if no card is inserted in the slot of the card reader; and an online status determining unit adapted to determine whether the card reader is online if the card inserting determining unit determines that the card is inserted in the slot; to inform the performing module to perform corresponding operation on the card according to the card operating requirement sent from the computer if the card reader is online; while to inform the operating module to perform operation with the card to generate a Token if the card reader is offline.

Preferably, the determining module includes an online status determining unit adapted to determine whether the card reader is online; and a card inserting determining unit adapted to determine whether a card is inserted in the slot of the card reader after the determination of the online status determining unit, if no card is inserted in the slot of the card reader, the card inserting determining unit being adapted to inform the operating module to perform operation to generate a one-time password, if a card is inserted in the slot of the card reader and the online status determining unit determines that the card reader is online, the card inserting determining unit being adapted to inform the performing module to perform the corresponding operation on the card according to the card operating requirement sent from the computer; while if a card is inserted in the slot of the card reader and the online status determining unit determines that the card reader is offline, the card inserting determining unit being adapted to inform the operating module to perform operation with the card to generate a Token.

Preferably, the determining module further includes a user requirement determining unit adapted to, if the determining module determines that no card is inserted in the slot, determine whether requirement of obtaining a one-time password from the user is received, if so, the user requirement determining unit inform the operating module to perform operation to generate a one-time password; otherwise, to end the process and return the card reader to the status of waiting for the system call.

Preferably, the determining module determines whether the card reader is online by checking the status of the USB of the card reader.

Preferably, the determining module further includes a card operating requirement determining unit adapted, if the determining module determines that a card is inserted in the slot and the card reader is online, to determine whether a card operating requirement is sent from the computer, if so, the card operating requirement determining unit being adapted to inform the performing module to perform corresponding operation on the card according to the card operating requirement sent from the computer; otherwise, to end the process and return the card reader goes back to the status of waiting for the system call.

Preferably, the determining module further includes a verification requirement determining unit adapted, if the determining module determines that a card is inserted in the slot and the card reader is offline, to determine whether a verification requirement from the user is received, if so, the verification requirement determining unit being adapted to inform the operating module to perform operation on the card to generate a Token; otherwise, to end the process and return the card reader to the status of waiting for the system call.

DETAILED DESCRIPTION OF THE INVENTION

Objects, technical solutions, and advantages of the invention will be easily understood by reference to the following description of embodiments when read in conjunction with the accompanying drawings.

The embodiment of the invention provides a method of implementing a card reader with such multiple functions that the card reader determines whether a card is inserted in its slot and whether the card reader is online; if there is no card in the slot of the card reader, the card reader performs operation to generate a one-time password; if there is a card in its slot and the card reader is online, the card reader performs corresponding operation on the card according to the requirement sent from the computer; and if there is a card in its slot and the card reader is offline, the card reader performs operation with the card to generate a Token.

Embodiment 1

Figure 1:
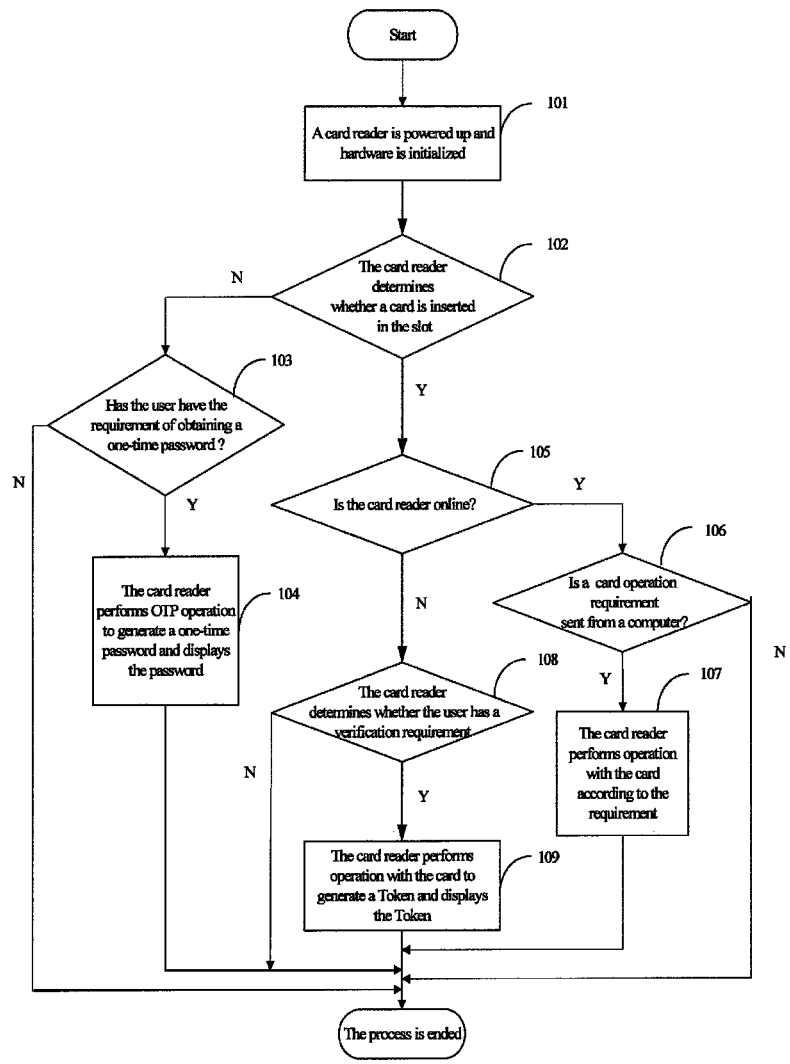
FIG. 1 is a flow chart illustrating a method for implementing a card reader with multiple functions according to Embodiment 1 of the present invention.

In the embodiment, a card reader has a keyboard and a LCD (Liquid Crystal Display). Referring to FIG. 1, the embodiment provides a method for implementing a card reader with multiple functions, which includes:

Step 101: the card reader is powered up and the hardware is initialized;

Step 102: the card reader determines whether a card is inserted in its slot, if so, go to Step 105; otherwise, go to Step 103;

Step 103: the card reader determines whether a requirement of obtaining a one-time password is received from a user; if so, go to Step 104; otherwise, the card reader end the process and goes back to the status of waiting for system call;

Thereby, the user sends a requirement of obtaining a one-time password to the card reader, which can be implemented by pressing a specified key on the card reader to generate a one-time password requirement.

Step 104: the card reader performs OTP (one-time password) operation to generate a one-time password and displays the one-time password on the LCD, then the card reader ends the process and goes back to status of waiting for system call;

Thereby, contrasted to the traditional static password, the OTP is a dynamic password which is a changeable password. The change of the password is originated from the change of the factor in operation of generating a password. Generally, the dynamic password generating algorithm adapts two factors, one is the identification code of the user which is fixed such as the private key of user, the other is a changeable factor such as time, random number or counter value, and the like. In the embodiment, the method of OTP operation is same as the method of that in the prior art.

Step 105: the card reader determines whether it is online; if so, go to Step 106; otherwise, the card reader is offline, go to Step 108;

Thereby, the step that the card reader determines whether it is online includes that the card reader checks its USB (Universal Serial Bus) status machine, and determines whether the USB is enumerated successfully, if so, that shows that the card reader is online; otherwise, the card reader is offline.

Step 106: the card reader determines whether a card operation requirement sent from a computer is received; if so, go to Step 107, otherwise, the card reader ends the process and goes back to the status of waiting for the system call;

Step 107: the card reader performs corresponding operation on the card according to the requirement sent from the computer, then the card reader ends the process and goes back to system call status;

Step 108: the card reader determines whether a requirement of verification is received from the user; if so, go to Step 109; otherwise, the card reader ends the process and goes back to the status of waiting for system call; and Step 109: the card reader performs operation with the card to generate a Token and displays the Token on the LCD; and then the card reader ends the process and goes back to the status of waiting for system call.

In the embodiment, the process above can be executed repeatedly after that the process is ended. That the card reader goes back to the status of waiting for system call means that the card reader goes back to Step 102, then the card reader executes the steps in the process described above.

In the embodiment, when the card reader is online and a card is inserted in the slot of the card reader, if the card reader receives a requirement of obtaining a one-time password or a requirement of obtaining a Token, the card reader can forbid any requirement, or generate and display a one-time password or generate a Token with the card and display the Token.

Figure 2:
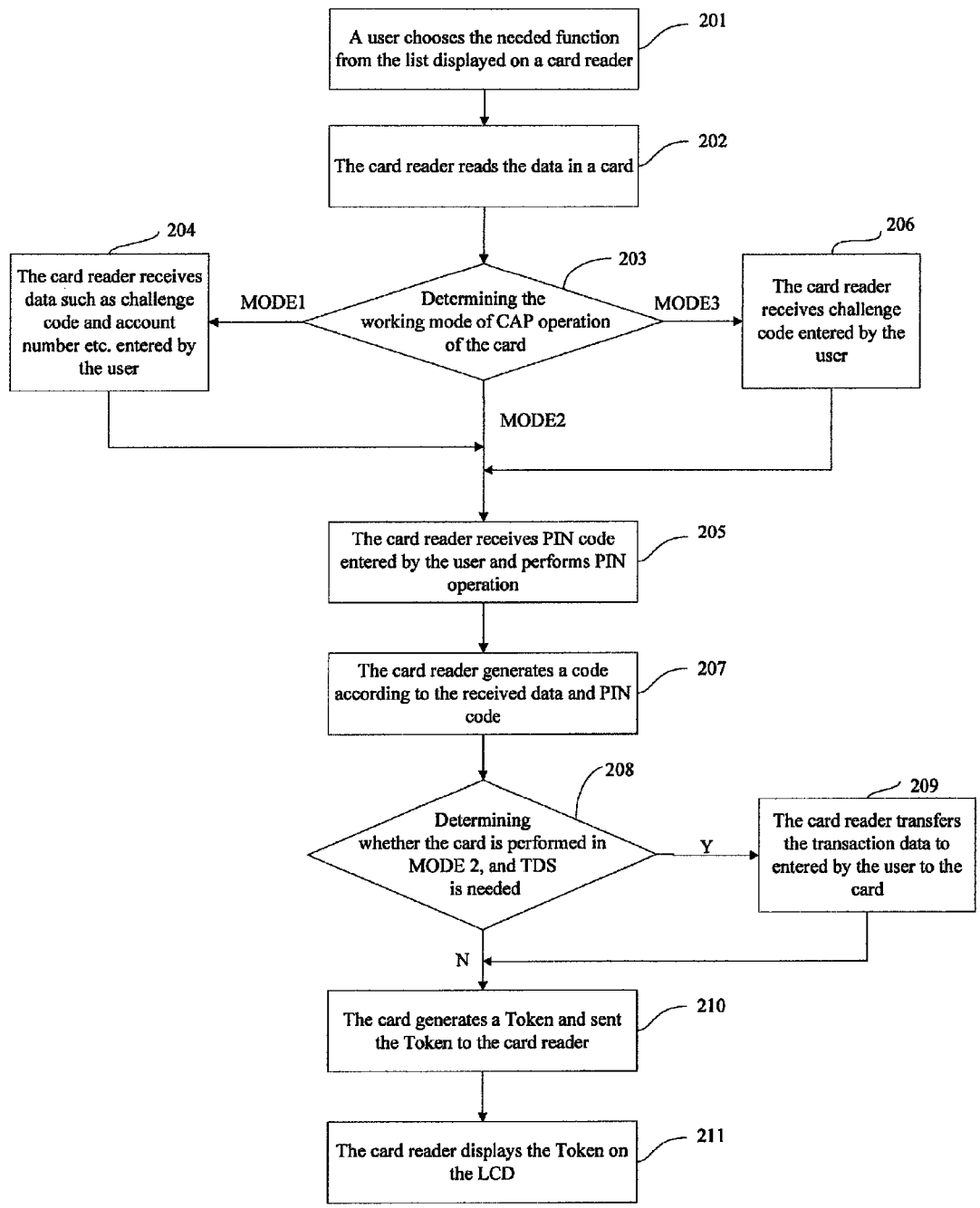
FIG. 2 is a flow chart illustrating generation of a Token by operation of the card reader with multiple functions according to Embodiment 1 of the present invention.

Referring to FIG. 2. the process of Step 109 in which the card reader performs operation with the card to generate a Token includes:

Step 201: the user chooses the function needed in the function list displayed on the card reader;

Step 202: the card reader reads the data in the card;

Step 203: the card reader determines the type of the working mode of card verification operation; if the type of the working mode is the first mode MODEL, go to Step 204; if the type of the working mode is the second mode MODE2, go to Step 205; if the type of the working mode is the third mode MODE3, go to Step 206;

In the embodiment, the first mode MODE 1 refers to the working mode that the card reader performs operation according to the data, such as a challenge code and a account number and the like, and PIN (Personal Identification Number) code entered by the user to generate a Token; the second mode MODE 2 refers to the working mode that the card reader performs operation according the PIN code entered by the user to generate a Token; and the third mode MODE 3 refers to the working mode that the card reader performs operation according to the challenge code and PIN code entered by the user to generate a Token.

Step 204: the card reader receives the data such as the challenge code and account number, and the like, entered by the user, and go to Step 205;

Step 205: the card reader receives the PIN code entered by the user and performs operation with the PIN code, then go to Step 207;

Step 206: the card reader receives the challenge code entered by the user, and then go to Step 205;

Step 207: the card reader generates AC (Application Cryptogram) according to the received data and PIN code;

Step 208: the card reader determines whether the working mode of card verification operation is MODE2 and needs TDS (Transaction Data Signing), if so, go to Step 209, otherwise, go to Step 210;

Step 209: the card reader transfers the transaction data to the card and go to Step 210;

Step 210: the card generates a Token and sends the Token to the card reader;

Step 211: the card reader displays the received Token on the LCD.

In the embodiment, the verification operation includes but not limited to CAP (Chip Authentication Program operation) and DPA (Dynamic Passcode Authentication). Thereby, the CAP, which is a method for verifying the identity of a cardholder, is an online process. By taking advantages of the verification function of the EMV chip payment card, the CAP provides identification verification for remote cardholder and evidence to prove the details of the transaction agreed by the cardholder.

Embodiment 2

Figure 3:
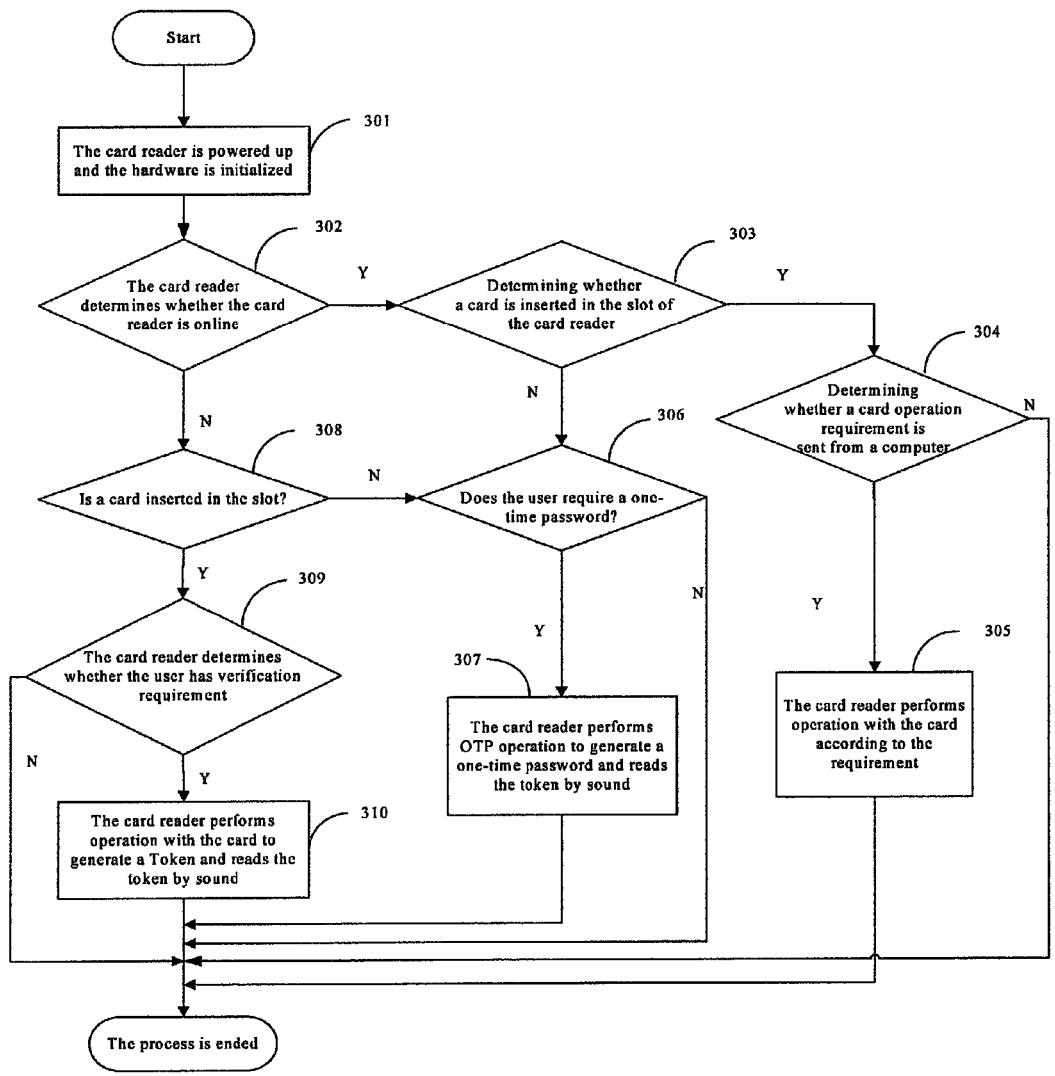
FIG. 3 is a flow chart illustrating a method for implementing a card reader with multiple functions according to Embodiment 2 of the present invention.

In the embodiment, a card reader has a keyboard and a sound generating means. Referring to FIG. 3, the embodiment provides a method for implementing another kind of card reader which includes:

Step 301: the card reader is powered up and the hardware is initialized;

Step 302: the card reader determines whether it is online, if so, go to Step 303, otherwise, the card reader is offline, go to Step 308;

Thereby, the step that the card reader determines whether it is online includes that the card reader checks its USB (Universal Serial Bus) status machine, and determines whether the USB is enumerated successfully, if so, that shows that the card reader is online; otherwise, the card reader is offline.

Step 303: the card reader determines whether a card is inserted in its slot, if so, go to Step 304, otherwise, go to Step 306;

Step 304: the card reader determines whether a card operation requirement sent from a computer is received; if so, go to Step 305, otherwise, the card reader ends the process and goes back to the status of waiting for the system call;

Step 305: the card reader performs corresponding operation on the card according to the requirement sent from the computer, then the card reader ends the process and goes back to system call status;

Step 306: the card reader determines whether a requirement of obtaining a one-time password from a user is received; if so, go to Step 307; otherwise, the card reader ends the process and goes back to the status of waiting for system call;

Thereby, the user sends a requirement of obtaining a one-time password, which can be implemented by pressing a specified key on the card reader to generate a one-time password requirement.

Step 307: the card reader performs OTP (one-time password) operation to generate a one-time password and reads the one-time password by sound, then the card reader ends the process and goes back to system call status;

Thereby, contrasted to the traditional static password, the OTP is a dynamic password which is a changeable password. The change of the password is originated from the change of the factor used for the operation of generating a password. Generally, the dynamic password generating algorithm adapts two factors, one is the identification code of the user which is fixed such as the private key of user, the other is a changeable factor such as time, random number or counter value, and the like. In the embodiment, the method of OTP operation is same as the method in the prior art.

Step 308: the card reader determines whether a card is inserted in its slot, if so, go to Step 309; otherwise, go to Step 306;

Step 309: the card reader determines whether the a requirement of verification is received from the user; if so, go to Step 310; otherwise, the card reader ends the process and goes back to the status of waiting for system call;

Step 310: the card reader performs operation with the card to generate a Token and reads the Token by sound, and then the card reader ends the process and goes back to the status of waiting for system call.

In the embodiment, the process above can be executed repeatedly after that the process is ended in Step 310. The step that the card reader goes back to the status of waiting for system call means that the card reader goes back Step 302, then the card reader executes process described above again.

In the embodiment, the process of Step 310 that the card reader performs operation with the card to generate a Token is same as the process of that in the embodiment 1. No more further detail is described here.

In the embodiment, when the card reader is online and a card is inserted in the slot of the card reader, if the card reader receives a requirement of obtaining a one-time password or a requirement of obtaining a Token, the card reader can forbid to generate a one-time password or a Token, or generate a one-time password and read the one-time password by sound, or generate a Token with the card and read the Token by sound.

In the embodiment, the verification operation includes but not limited to CAP (Chip Authentication Program operation) and DPA (Dynamic Passcode Authentication). Thereby, the CAP, which is a method for verifying the identity of a cardholder, is an online process. By taking advantages of the verification function of the EMV chip payment card, the CAP provides identification verification for remote cardholder and evidence to prove the details of the transaction agreed by the cardholder.

Embodiment 3

Figure 4:
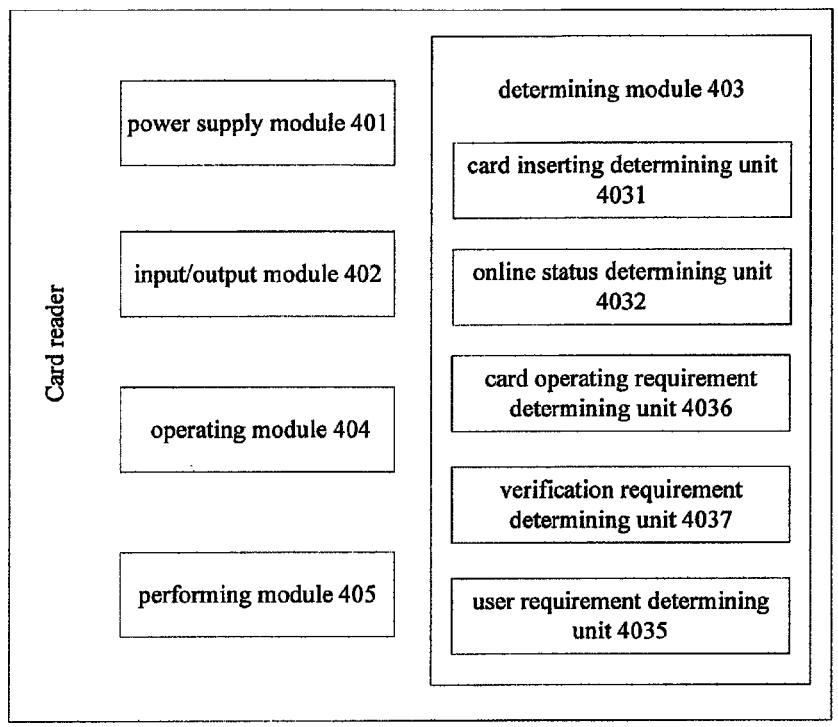
FIG. 4 is a structural diagram illustrating a card reader with multiple functions according to Embodiment 3 of the present invention.

Referring to FIG. 4, the embodiment of the invention provides a card reader with multiple functions, which includes a power supply module 401 adapted to supply power to the card reader; in the embodiment, the power for the card reader can be supplied by cells or by the USB interface;

an input/output module 402 adapted to receive the data information entered by a user; further adapted to output a one-time password or a Token generated by the card reader; in the embodiment, the input/output module can receive the information entered by a user by keyboard and display the one-time password or the Token generated by the card reader by display, or read the one-time password or the Token by a sound generating means;

a determining module 403 adapted to determine whether a card is inserted in slot of the card reader, to determine whether the card reader is online, and to determine whether a requirement of verification from a user is received;

an operating module 404 adapted to perform OTP operation to generate a one-time password if the determining module 403 determines that no card is inserted in the slot of the card reader; to perform operation with the card to generate a Token if the determining module 403 determines that a card is inserted in the slot of the card reader and the card reader is offline and a requirement of verification is received from the user; and a performing module 405 is adapted to perform corresponding operation on the card according to the card operation requirement sent from a computer if the determining module 403 determines that a card is inserted in the slot of the reader and the card reader is online;

In the embodiment, the determining module 403 can determine whether a card is inserted in the slot of the card reader and then determine whether the card reader is online, that is, the determining module 403 includes a card inserting determining unit 4031 adapted to determine whether a card is inserted in the slot of the card reader; and an online status determining unit 4032 adapted to determine whether the card reader is online if the card inserting determining unit 4031 determines that the card is inserted in the slot; to inform the performing module 405 to perform corresponding operation on the card according to the card operating requirement sent from the computer if the card reader is online; to inform the operating module 404 to perform operation with the card to generate a Token if the card reader is offline.

Figure 5:
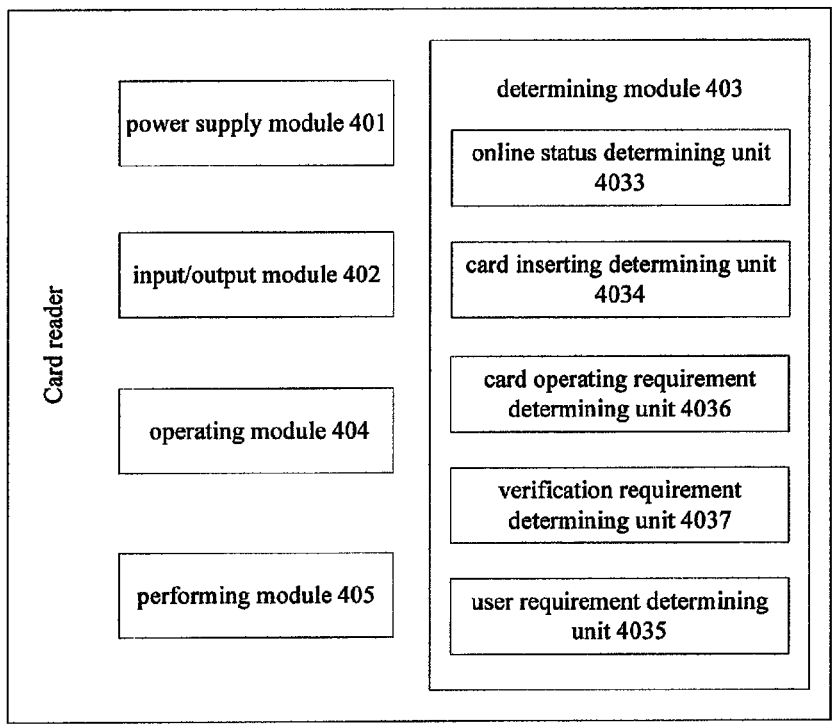
FIG. 5 is a structural diagram illustrating another card reader with multiple functions according to Embodiment 3 of the present invention.

In addition, referring to FIG. 5, the determining module 403 can determine whether the card reader is online and then determine whether a card is inserted in the slot of the card reader, that is, the determining module 403 includes an online status unit 4033 adapted to determine whether the card reader is online;

a card inserting determining unit 4034 adapted to determine whether a card is inserted in the slot of the card reader after the determination of the online status determining unit 4033, if no card is inserted in the slot of the card reader, the card inserting determining unit 4034 being adapted to inform the operating module 404 to perform operation to generate a one-time password, if a card is inserted in the slot of the card reader and the online status determining unit 4033 determines that the card reader is online, the card inserting determining unit 4034 being adapted to inform the performing module 405 to perform the corresponding information on the card according to the card operating requirement sent from the computer; and if a card is inserted in the slot of the card reader and the online status determining unit 4033 determines that the card reader is offline, the card inserting determining unit 4034 being adapted to inform the operating module 404 to perform operation with the card to generate a Token.

In the embodiment, whatever the sequence of the determining steps by the determining module 403 is, the determining module 403 can determine whether the card reader is online by checking the USB status of the card reader.

In the embodiment, whatever the sequence of determining steps by the determining module 403 is, the determining module 403 further includes a user requirement determining unit 4035 adapted to, if the determining module 403 determines that no card is inserted in the slot, determine whether requirement of obtaining a one-time password from the user is received, if so, the user requirement determining unit 4035 informing the operating module 404 to perform operation to generate a one-time password, otherwise, the card reader ends the process and goes back to the status of waiting for the system call.

In the embodiment, whatever the sequence of determining steps by the determining module 403 is, the determining module 403 further includes a card operating requirement determining unit 4036 which is adapted to, if the determining module 403 determines that a card is inserted in the slot and the card reader is online, determine whether a card operating requirement is sent from the computer, if so, the card operating requirement determining unit 4036 is adapted to inform the performing module 405 to perform corresponding operation on the card according to the card operating requirement sent from the computer; otherwise, the card reader ends the process and goes back to the status of waiting for the system call.

In the embodiment, whatever the sequence of the determining steps by the determining module 403, the determining module 403 further includes a verification requirement determining unit 4037 adapted to, if the determining module 403 determines that a card is inserted in the slot and the card reader is offline, determine whether a verification requirement from the user is received, if so, the verification requirement determining unit 4037 being adapted to inform the operating module 404 to perform operation with the card to generate a Token; otherwise, the card reader ends the process and goes back to the status of waiting for the system call.

The determining module 403 can includes a user requirement determining unit 4035, a card operating requirement determining unit 4036, or a verification requirement determining unit 4037, or a combination from any of the three units.

In the embodiment, the verification operation includes but not limited to CAP (Chip Authentication Program operation) and DPA (Dynamic Passcode Authentication). Thereby, the CAP, which is a method for verifying the identity of a cardholder, is an online process which takes advantages of the verification function of the EMV chip payment card, provides identification verification for remote cardholder, and provides evidence to prove the details of the transaction agreed by the cardholder.

In the embodiment, the process that the operating module 404 performs operation with the card to generate a Token is same as the process of that in the embodiment 1. No more further detail is described here.

From the technology described above, the invention provides a card reader with multiple functions and a method for implementing the same, which overcomes the shortcomings that the card reader in the prior art has simplex function. And the card reader provided by the invention has good common performance. Besides the function of reading the card, the card reader is further adapted to perform verification when the card is inserted in the slot of the card reader, for example, generating a Token, and further adapted in identification authentication field such as online bank and transaction online and the like. Furthermore, the card reader is adapted to generate a one-time password or a challenge code without a card in the field of identification verification in the internet game or operation system.

The presently disclosed embodiments should be considered in all respects to be illustrative and not restrictive. The scope of the invention is indicated by the appended claims rather than the foregoing description, and all variations which come within the meaning and range of equivalents thereof are intended to be embraced therein.

The invention claimed is:

1. A method for implementing a card reader with multiple functions, wherein the method includes powering up the card reader and entering status of waiting for system call;

determining, by the card reader, whether a card is inserted in a slot of the card reader and whether the card reader is online;

performing, by the card reader, operation to generate a one-time password and going back to the status of waiting for system call, if determining that no card is inserted in the slot of the card reader and if a requirement of obtaining a one-time password is received from a user;

performing, by the card reader, corresponding operation on a card according to a card operating requirement sent from a computer and going back to the status of waiting for system call, if determining that the card is inserted in the slot of the card reader, the card reader is online and if a requirement of card operation is received from the user;

performing operation, by the card reader, with a card to generate a Token and going back to the status of waiting for system call, if determining that the card is inserted in the slot of the card reader, the card reader is offline and if a requirement of verification is received from the user;

wherein performing operation, by the card reader, with a card to generate a Token comprising:

choosing, by the user, function needed in the function list displayed on the card reader;

determining, by the card reader, a type of the working mode of Token generation operation;

performing operation according to a challenge code, an account number and PIN code entered by the user to generate a Token if the type of the working mode is a first mode that the card reader performs operations according to the challenge code, the account number and the PIN code entered by the user to generate a Token;

performing operation according the PIN code entered by the user to generate a Token if the type of the working mode is a second mode that the card reader performs operations according to the PIN code entered by the user to generate a Token;

performing operation according to the challenge code, PIN code entered by the user to generate a Token if the type of working mode is a third mode that the card reader performs operation according to the challenge code and PIN code entered by the user to generate a Token.

2. The method for implementing a card reader with multiple functions according to claim 1, wherein the method includes determining, by the card reader, whether a card is inserted in the slot of the card reader;

performing operation, by the card reader, to generate a one-time password, if no card is inserted in the card reader; otherwise determining, by the card reader, whether the card reader itself is online, performing, by the card reader, corresponding operation on the card according to the card operating requirement sent from the computer, if the card reader is online;

performing, by the card reader, operation with the card to generate a Token, if the card reader is offline.

3. The method for implementing a card reader with multiple functions according to claim 1, wherein the method includes determining, by the card reader, whether the card reader itself is online;

determining, by the card reader, whether a card is inserted in the slot of the card reader, if the card reader is online;

performing, by the card reader, operation to generate a one-time password, if no card is inserted in the slot;

performing, by the card reader, corresponding operation on the card according to the card operating requirement sent from the computer, if the card is inserted in the slot;

determining, by the card reader, whether a card is inserted in the slot of the card reader, if the card reader is offline;

performing, by the card reader, operation to generate a one-time password, if no card is inserted in the slot; and performing, by the card reader, operation with the card to generate a Token, if the card is inserted in the slot.

4. The method for implementing a card reader with multiple functions according to claim 1, wherein before performing, by the card reader, operation to generate a one-time password, the method further includes determining, by the card reader, whether the user requires to obtain a one-time password; if so, performing the step of performing operation to generate a one-time password; otherwise, ending the process and returning to the status of waiting for system call.

5. The method for implementing a card reader with multiple functions according to claim 1, wherein determining, by the card reader, whether the card reader is online is performed by checking USB status of the card reader.

6. The method for implementing a card reader with multiple functions according to claim 1, wherein before performing, by the card reader, corresponding operation on the card according to the card operating requirement sent from a computer, the method further includes determining, by the card reader, whether an operating requirement is sent from the computer, if so, performing the step of performing corresponding operation on the card according to the requirement sent from the computer; otherwise, ending the process and returning to the status of waiting for system call.

7. The method for implementing a card reader with multiple functions according to claim 1, wherein before performing, by the card reader, operation with the card to generate a Token, the method further includes determining, by the card reader, whether the user requires verification, if so, performing, by the card reader, operating with the card to generate a Token; otherwise, ending the process and returning to the status of waiting for system call.

8. A card reader with multiple functions, wherein the card reader includes a power module adapted to supply power to the card reader;

an input/output module adapted to receive information entered by the user, and further to output a one-time password or a Token generated by the card reader;

a determining module adapted to determine whether a card is inserted in the slot of the card reader and whether the card reader is online;

an operating module adapted to perform operation to generate a one-time password and going back to the status of waiting for system call if the determining module determines that no card is inserted in the card reader and if a requirement of obtaining a one-time password is received from a user, and perform operation with the card to generate a Token and going back to the status of waiting for system call if the determining module determines that a card is inserted in the slot of the card reader, the card reader is offline and if a requirement of verification is received from the user; and a performing module adapted to perform corresponding operation on the card according to the card operating requirement sent from a computer and going back to the status of waiting for system call if the determining module determines that a card is inserted in the slot of the card reader, the card reader is online and if a requirement of card operation is received from the user wherein performing operation, by the card reader, with a card to generate a Token comprising:

choosing, by the user, function needed in the function list displayed on the card reader;

determining, by the card reader, type of the working mode of Token generation operation;

performing operation according to a challenge code, an account number and PIN code entered by the user to generate a Token if the type of the working mode is a first mode that the card reader performs operation according to the challenge code, the account number and the PIN code entered by the user to generate a Token;

performing operation according the PIN code entered by the user to generate a Token if the type of working mode is a second mode that the card reader performs operation according the PIN code entered by the user to generate a Token;

performing operation according to the challenge code, PIN code entered by the user to generate a Token if the type of working mode is a third mode that the card reader performs operation according to the challenge code and PIN code entered by the user to generate a Token.

9. The card reader with multiple functions according to claim 8, wherein the power module is adapted to supply power to the card reader by cells or USB interface.

10. The card reader with multiple functions according to claim 8, wherein the input/output module includes a keyboard unit, a touching unit, a displaying unit, and a sound generating unit.

11. The card reader with multiple functions according to claim 8, wherein the determining module includes a card inserting determining unit adapted to determine whether a card is inserted in the slot of the card reader, and to inform the operating module to perform operating to generate a one-time password if no card is inserted in the slot of the card reader; and an online status determining unit adapted to determine whether the card reader is online if the card inserting determining unit determines that a card is inserted in the slot; to inform the performing module to perform corresponding operation on the card according to the card operating requirement sent from the computer if the card reader is online; while to inform the operating module to perform operation with the card to generate a Token if the card reader is offline.

12. The card reader with multiple functions according to claim 8, wherein the determining module includes an online status determining unit adapted to determine whether the card reader is online; and a card inserting determining unit adapted to determine whether a card is inserted in the slot of the card reader after the determination of the online status determining unit, if no card is inserted in the slot of the card reader, the card inserting determining unit being adapted to inform the operating module to perform operation to generate a one-time password, if a card is inserted in the slot of the card reader and the online status determining unit determines that the card reader is online, the card inserting determining unit being adapted to inform the performing module to perform the corresponding operation on the card according to the card operating requirement sent from the computer; while if a card is inserted in the slot of the card reader and the online status determining unit determines that the card reader is offline, the card inserting determining unit being adapted to inform the operating module to perform operation with the card to generate a Token.

13. The card reader with multiple functions according to claim 8, wherein the determining module further includes
   a user requirement determining unit adapted to, if the determining module determines that no card is inserted in the slot, determine whether requirement of obtaining a one-time password from the user is received, if so, the user requirement determining unit inform the operating module to perform operation to generate a one-time password; otherwise, to end the process, and return the card reader to the status of waiting for the system call.

14. The card reader with multiple functions according to claim 8, wherein the determining module determines whether the card reader is online by checking the USB status of the card reader.

15. The card reader with multiple functions according to claim 8, wherein the determining module further includes
   a card operating requirement determining unit adapted to, if the determining module determines that a card is inserted in the slot and the card reader is online, determine whether a card operating requirement is sent from the computer, if so, the card operating requirement determining unit being adapted to inform the performing module to perform corresponding operation on the card according to the card operating requirement sent from the computer; otherwise, to end the process and return the card reader to the status of waiting for the system call.

16. The card reader with multiple functions according to claim 8, wherein the determining module further includes
   a verification requirement determining unit adapted to, if the determining module determines that a card is inserted in the slot and the card reader is offline, determine whether a verification requirement from the user is received, if so, the verification requirement determining unit being adapted to inform the operating module to perform operation on the card to generate a Token; otherwise, to end the process and return the card reader to the status of waiting for the system call.

* * * * *